United States Patent [19]
Johansson

[11] Patent Number: 5,488,644
[45] Date of Patent: Jan. 30, 1996

[54] SPRING ASSEMBLIES FOR ADJOINING NUCLEAR FUEL ROD CONTAINING FERRULES AND A SPACER FORMED OF THE SPRING ASSEMBLIES AND FERRULES

[75] Inventor: Eric B. Johansson, Wrightsville Beach, N.C.

[73] Assignee: General Electric Company, Schenectady, N.Y.

[21] Appl. No.: 274,516

[22] Filed: Jul. 13, 1994

[51] Int. Cl.$^6$ .................................................. G21C 3/34
[52] U.S. Cl. ........................ 376/441; 376/446; 376/448
[58] Field of Search ..................................... 376/441, 446, 376/439, 444, 448; 976/DIG. 73, DIG. 77

[56] References Cited

U.S. PATENT DOCUMENTS

| | | | |
|---|---|---|---|
| 3,344,855 | 10/1967 | Clark | 165/159 |
| 3,350,276 | 10/1967 | Warberg et al. | 176/78 |
| 3,457,140 | 7/1969 | Glandin | 376/442 |
| 3,749,640 | 7/1973 | Israel | 176/78 |
| 3,809,609 | 5/1974 | Krawiec et al. | 176/78 |
| 3,886,038 | 5/1975 | Raven | 376/439 |
| 3,944,467 | 3/1976 | Biermann et al. | 376/442 |
| 3,944,779 | 3/1976 | Umino et al. | 219/121 EM |
| 4,005,521 | 2/1977 | Kaplan et al. | 29/428 |
| 4,039,379 | 8/1977 | Patterson et al. | 376/439 |
| 4,061,536 | 12/1977 | Creagan et al. | 376/439 |
| 4,069,102 | 1/1978 | Berringer et al. | 376/463 |
| 4,077,843 | 3/1978 | Patterson et al. | 376/442 |
| 4,086,809 | 5/1978 | Wu et al. | 73/161 |
| 4,089,742 | 5/1978 | Amaral et al. | 376/440 |
| 4,108,719 | 8/1978 | Olshausen | 376/245 |
| 4,119,489 | 10/1978 | Itoh et al. | 376/444 |

(List continued on next page.)

FOREIGN PATENT DOCUMENTS

| | | |
|---|---|---|
| 0192092 | 1/1986 | European Pat. Off. . |
| 0330013 | 2/1989 | European Pat. Off. . |
| 0237064 | 3/1991 | European Pat. Off. . |
| 0428092 | 5/1991 | European Pat. Off. . |
| 0428093 | 5/1991 | European Pat. Off. . |
| 0273183 | 8/1991 | European Pat. Off. . |
| 0489334 | 6/1992 | European Pat. Off. . |
| 0503553 | 9/1992 | European Pat. Off. . |
| 0514115 | 11/1992 | European Pat. Off. . |
| 0514116 | 11/1992 | European Pat. Off. . |
| 0514117 | 11/1992 | European Pat. Off. . |
| 0514120 | 11/1992 | European Pat. Off. . |
| 0518306 | 12/1992 | European Pat. Off. . |
| 0539867 | 5/1993 | European Pat. Off. . |
| 1-1384493 | 5/1989 | Japan . |
| 2-163695 | 6/1990 | Japan . |
| 327019 | 7/1968 | Sweden . |
| 312612 | 7/1968 | Sweden . |
| 454823 | 5/1988 | Sweden . |
| 5,375,756 | 12/1994 | Haughton et al. ............... 228/10 |
| 5,377,236 | 12/1994 | Smith et al. ..................... 376/258 |
| 454824 | 5/1988 | Sweden . |
| 1153444 | 5/1969 | United Kingdom . |

Primary Examiner—Donald P. Walsh
Assistant Examiner—Meena Chelliah
Attorney, Agent, or Firm—Nixon & Vanderhye

[57] ABSTRACT

Spring assemblies are employed in adjoining ferrules of a spacer in a nuclear fuel bundle to bias the fuel rods against stops and hence position the fuel rods in the spacer. The spring assemblies in one form include back-to-back spring bodies having central leaves with forward projections extending through rectilinear openings in adjacent ferrules to engage fuel rods to bias the rods against stops at the opposite sides of the ferrules. Outer pairs of leaves straddle the central leaf and project rearwardly and join the spring bodies one with the other whereby the central leaves, end portions of the springs connected to the central and outer leaves, and the outer leaves act as paired springs in series, providing a low spring constant. In another form, a single spring body has a central leaf with a projection extending through an aperture of a ferrule to bias the fuel rod. The outer leaves bear against the outer surface of the adjoining ferrule. In this latter form, pins may be used to compress the springs to facilitate insertion of the fuel rods into the ferrules.

15 Claims, 8 Drawing Sheets

U.S. PATENT DOCUMENTS

| | | | |
|---|---|---|---|
| 4,124,444 | 11/1978 | Jabsen | 376/462 |
| 4,125,435 | 11/1978 | Jabsen | 376/442 |
| 4,137,125 | 1/1979 | Walters | 219/127 |
| 4,142,934 | 3/1979 | Wild | 376/434 |
| 4,172,761 | 10/1979 | Raven et al. | 376/462 |
| 4,175,003 | 11/1979 | Beuchel et al. | 376/442 |
| 4,190,494 | 2/1980 | Olsson | 376/462 |
| 4,221,636 | 9/1980 | Feutrel | 376/441 |
| 4,224,107 | 9/1980 | Delafosse et al. | 376/462 |
| 4,239,597 | 12/1980 | Christiansen | 376/441 |
| 4,246,783 | 1/1981 | Steven et al. | 73/161 |
| 4,268,356 | 5/1981 | Kmonk et al. | 376/462 |
| 4,312,705 | 1/1982 | Steinke | 376/441 |
| 4,313,797 | 2/1982 | Attix | 376/441 |
| 4,325,786 | 4/1982 | Wohlsen | 376/442 |
| 4,357,298 | 11/1982 | Wolters, Jr. et al. | 376/441 |
| 4,391,771 | 7/1983 | Anthony | 376/451 |
| 4,396,573 | 8/1983 | Feutrel | 376/442 |
| 4,416,852 | 11/1983 | Nylund | 376/438 |
| 4,418,036 | 11/1983 | Gjertsen et al. | 376/438 |
| 4,420,458 | 12/1983 | Dunlap et al. | 376/447 |
| 4,435,357 | 3/1984 | Krieger | 376/272 |
| 4,454,093 | 6/1984 | Nylund et al. | 376/282 |
| 4,474,730 | 10/1984 | Hellman et al. | 376/462 |
| 4,478,786 | 10/1984 | Andersson et al. | 376/444 |
| 4,489,038 | 12/1984 | Nylund | 376/446 |
| 4,491,540 | 1/1985 | Larker et al. | 252/628 |
| 4,492,844 | 1/1985 | Kobuck et al. | 219/121 |
| 4,499,047 | 2/1985 | Borrman et al. | 376/434 |
| 4,508,679 | 4/1985 | Matzner et al. | 376/438 |
| 4,512,820 | 4/1985 | Mori et al. | 148/12.7 N |
| 4,521,374 | 6/1985 | Duncan | 376/462 |
| 4,522,330 | 6/1985 | Kerrey et al. | 228/182 |
| 4,526,744 | 7/1985 | Borrman et al. | 376/440 |
| 4,526,745 | 7/1985 | Nylund et al. | 376/444 |
| 4,526,746 | 7/1985 | Fredin | 376/444 |
| 4,540,545 | 9/1985 | Kondo | 376/364 |
| 4,544,522 | 10/1985 | Curulla et al. | 376/441 |
| 4,556,531 | 12/1985 | Curulla | 376/441 |
| 4,557,892 | 12/1985 | Komoda et al. | 376/412 |
| 4,571,324 | 2/1986 | Johansson et al. | 376/441 |
| 4,578,240 | 3/1986 | Cadwell | 376/441 |
| 4,579,711 | 4/1986 | Mishima et al. | 376/442 |
| 4,585,614 | 4/1986 | Helmersson | 376/434 |
| 4,585,616 | 4/1986 | DeMario et al. | 376/442 |
| 4,587,093 | 5/1986 | Borrman et al. | 376/444 |
| 4,587,704 | 5/1986 | Matzner et al. | 29/446 |
| 4,588,550 | 5/1986 | Blomstrand et al. | 376/438 |
| 4,597,937 | 7/1986 | Sakurai et al. | 376/441 |
| 4,617,170 | 10/1986 | Suchy | 376/438 |
| 4,632,804 | 12/1986 | Wallander et al. | 376/444 |
| 4,645,643 | 2/1987 | Leclercq | 376/447 |
| 4,646,021 | 2/1987 | Brown | 324/303 |
| 4,649,021 | 3/1987 | Taleyarkhan | 376/444 |
| 4,652,426 | 3/1987 | Boyle et al. | 376/352 |
| 4,654,193 | 3/1987 | Amano et al. | 376/436 |
| 4,655,995 | 4/1987 | Freeman et al. | 376/267 |
| 4,656,000 | 4/1987 | Sakurai et al. | 376/352 |
| 4,659,541 | 4/1987 | Rylatt | 376/442 |
| 4,659,542 | 4/1987 | Kerrey | 376/442 |
| 4,659,543 | 4/1987 | Lui | 376/441 |
| 4,661,220 | 4/1987 | Fejes et al. | 204/141.5 |
| 4,664,882 | 5/1987 | Doshi | 376/42.3 |
| 4,665,866 | 5/1987 | Wepfer | 122/510 |
| 4,666,657 | 5/1987 | Altman | 376/234 |
| 4,666,663 | 5/1987 | Steinke | 376/441 |
| 4,666,664 | 5/1987 | Doshi | 376/261 |
| 4,671,926 | 6/1987 | Broberg et al. | 376/364 |
| 4,675,154 | 6/1987 | Nelson et al. | 376/444 |
| 4,683,115 | 7/1987 | Frömel | 376/439 |
| 4,686,079 | 8/1987 | Ishikawa et al. | 376/444 |
| 4,689,091 | 8/1987 | Yoshida et al. | 148/11.5 F |
| 4,692,302 | 9/1987 | DeMario et al. | 376/439 |
| 4,692,303 | 9/1987 | Osborne | 376/446 |
| 4,695,426 | 9/1987 | Nylund | 376/441 |
| 4,698,204 | 10/1987 | Taleyarkhan | 376/439 |
| 4,702,881 | 10/1987 | Weiland et al. | 376/442 |
| 4,705,663 | 11/1987 | Steven et al. | 376/442 |
| 4,707,328 | 11/1987 | Arbink et al. | 376/446 |
| 4,708,845 | 11/1987 | Mildrum et al. | 376/438 |
| 4,711,436 | 12/1987 | Kobuck et al. | 269/40 |
| 4,714,585 | 12/1987 | Kast | 376/442 |
| 4,716,011 | 12/1987 | Taleyarkhan | 376/281 |
| 4,716,016 | 12/1987 | DeMario et al. | 376/446 |
| 4,725,403 | 2/1988 | Buettiker | 376/439 |
| 4,726,926 | 2/1988 | Patterson et al. | 376/439 |
| 4,728,490 | 3/1988 | Taleyarkhan | 376/439 |
| 4,729,867 | 3/1988 | DeMario | 376/261 |
| 4,735,766 | 4/1988 | Scharpenberg | 376/245 |
| 4,735,769 | 4/1988 | Lettau | 376/441 |
| 4,738,819 | 4/1988 | Taleyarkhan | 376/444 |
| 4,738,821 | 4/1988 | Shallenberger et al. | 376/446 |
| 4,740,350 | 4/1988 | Taleyarkhan | 376/441 |
| 4,740,351 | 4/1988 | Katsumizu et al. | 376/446 |
| 4,744,942 | 5/1988 | Ferrari et al. | 376/442 |
| 4,749,547 | 6/1988 | Blomstrand et al. | 376/444 |
| 4,753,774 | 6/1988 | Taleyarkhan et al. | 376/444 |
| 4,756,878 | 7/1988 | King et al. | 376/439 |
| 4,758,403 | 7/1988 | Noailly | 376/439 |
| 4,759,912 | 7/1988 | Taleyarkhan | 376/435 |
| 4,770,843 | 9/1988 | Taleyarkhan | 376/216 |
| 4,775,509 | 10/1988 | Noailly et al. | 376/442 |
| 4,780,273 | 10/1988 | Dressel | 376/441 |
| 4,784,825 | 11/1988 | Busselman et al. | 376/399 |
| 4,793,963 | 12/1988 | DeMario et al. | 376/267 |
| 4,795,608 | 1/1989 | Nylund | 376/444 |
| 4,803,043 | 2/1989 | DeMario et al. | 376/442 |
| 4,804,516 | 2/1989 | Thomazet et al. | 376/439 |
| 4,818,471 | 4/1989 | Thomson et al. | 376/254 |
| 4,818,473 | 4/1989 | Lui | 376/261 |
| 4,818,478 | 4/1989 | Taleyarkhan | 376/435 |
| 4,828,782 | 5/1989 | Donnelly | 376/252 |
| 4,839,136 | 6/1989 | DeMario et al. | 376/462 |
| 4,844,860 | 7/1989 | Hatfield | 376/439 |
| 4,849,161 | 7/1989 | Brown et al. | 376/439 |
| 4,859,407 | 8/1989 | Nylund | 376/446 |
| 4,869,865 | 9/1989 | White et al. | 376/260 |
| 4,879,090 | 11/1989 | Perrotti et al. | 376/462 |
| 4,885,127 | 12/1989 | Yokoyama | 376/462 |
| 4,895,698 | 1/1990 | DeMario | 376/442 |
| 4,913,707 | 4/1990 | Moreno et al. | 29/792 |
| 4,913,875 | 4/1990 | Johansson et al. | 376/439 |
| 4,924,586 | 5/1990 | King et al. | 29/723 |
| 4,931,615 | 6/1990 | Muncy et al. | 219/121.67 |
| 4,946,587 | 8/1990 | Reeves et al. | 209/539 |
| 4,957,697 | 9/1990 | Wada | 376/442 |
| 4,970,048 | 11/1990 | Noailly | 376/439 |
| 4,980,121 | 12/1990 | Roberts et al. | 376/439 |
| 4,988,474 | 1/1991 | Hoffmann et al. | 376/261 |
| 4,994,234 | 2/1991 | Nylund | 376/445 |
| 4,999,153 | 3/1991 | Johansson et al. | 376/443 |
| 5,002,726 | 3/1991 | Johansson | 376/448 |
| 5,024,807 | 6/1991 | Hatfield et al. | 376/352 |
| 5,024,810 | 6/1991 | Bachman | 376/438 |
| 5,032,351 | 7/1991 | Johansson | 376/438 |
| 5,035,853 | 7/1991 | Lettau et al. | 376/441 |
| 5,069,864 | 12/1991 | Johansson | 376/441 |
| 5,078,961 | 1/1992 | Johansson et al. | 376/448 |
| 5,080,858 | 1/1992 | Nylund | 376/443 |
| 5,085,827 | 2/1992 | Johansson et al. | 376/444 |
| 5,089,220 | 2/1992 | Nylund | 376/439 |
| 5,089,221 | 2/1992 | Johansson et al. | 376/442 |

| Patent No. | Date | Inventor | Class |
|---|---|---|---|
| 5,091,145 | 2/1992 | Petit | 376/441 |
| 5,094,805 | 3/1992 | Suchy et al. | 376/438 |
| 5,096,660 | 3/1992 | Hembjer et al. | 376/438 |
| 5,110,539 | 5/1992 | Perrotti et al. | 376/439 |
| 5,128,097 | 7/1992 | Fukasawa et al. | 376/438 |
| 5,130,083 | 7/1992 | Johansson | 376/441 |
| 5,139,736 | 8/1992 | Bryan | 376/442 |
| 5,147,600 | 9/1992 | Kadono et al. | 376/442 |
| 5,149,495 | 9/1992 | Elkins | 376/444 |
| 5,173,252 | 12/1992 | Johansson | 376/448 |
| 5,174,949 | 12/1992 | Johansson | 376/439 |
| 5,178,825 | 1/1993 | Johansson | 376/438 |
| 5,180,548 | 1/1993 | Verdier | 376/439 |
| 5,180,550 | 1/1993 | Nylund | 376/449 |
| 5,183,629 | 2/1993 | Canat et al. | 376/439 |
| 5,186,891 | 2/1993 | Johansson et al. | 376/438 |
| 5,200,143 | 4/1993 | Johansson | 376/449 |
| 5,209,899 | 5/1993 | Johansson et al. | 376/442 |
| 5,211,908 | 5/1993 | Verdier | 376/442 |
| 5,226,633 | 7/1993 | Willard, Jr. | 267/159 |
| 5,229,068 | 7/1993 | Johansson et al. | 376/371 |
| 5,243,634 | 9/1993 | Bryan | 376/439 |
| 5,245,644 | 9/1993 | Büttner et al. | 376/442 |
| 5,253,278 | 10/1993 | Kanazawa et al. | 376/434 |
| 5,259,009 | 11/1993 | Patterson et al. | 376/439 |
| 5,263,071 | 11/1993 | Farkas et al. | 376/438 |
| 5,272,743 | 12/1993 | Yamazaki et al. | 376/463 |
| 5,313,506 | 5/1994 | Matzner et al. | 376/441 |
| 5,317,613 | 5/1994 | Fennern | 376/439 |
| 5,327,470 | 7/1994 | Johansson | 376/438 |
| 5,343,504 | 8/1994 | Gaylord, Jr. et al. | 376/247 |
| 5,345,487 | 9/1994 | Johansson | 376/444 |
| 5,361,288 | 11/1994 | Johansson | 376/441 |
| 5,371,768 | 12/1994 | Matzner | 376/439 |
| 5,371,769 | 12/1994 | Kato et al. | 376/442 |
| 5,375,154 | 12/1994 | Matzner et al. | 376/441 |

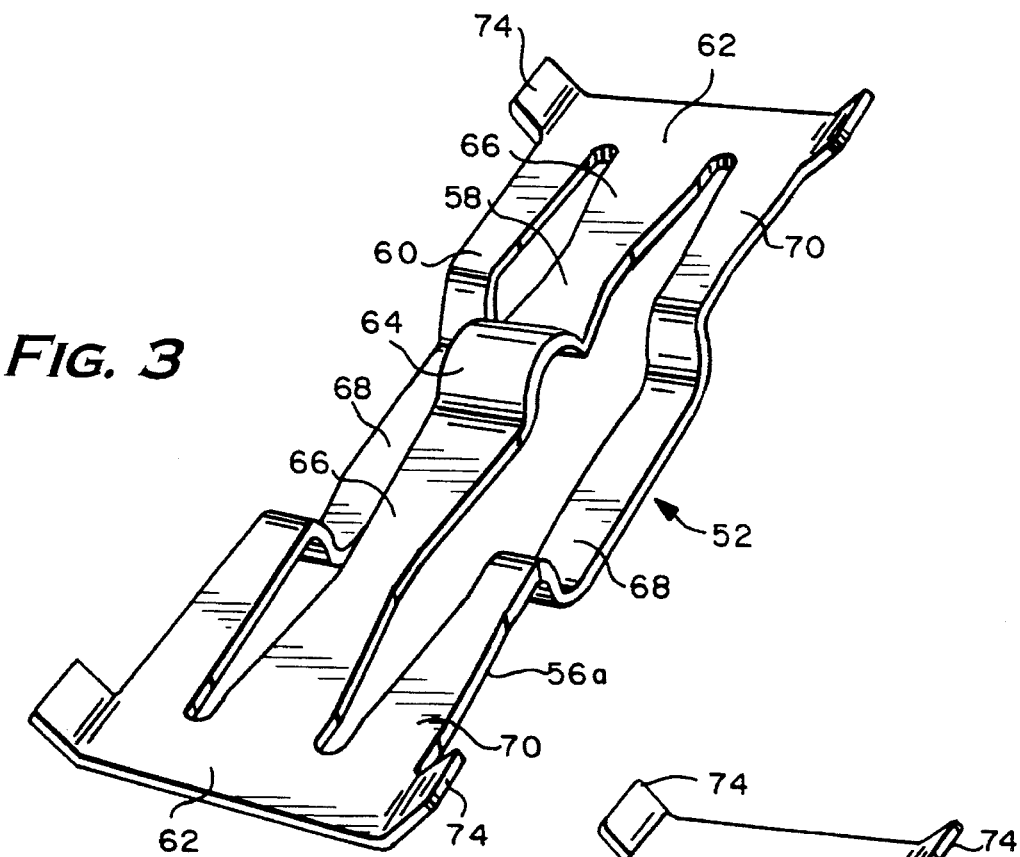
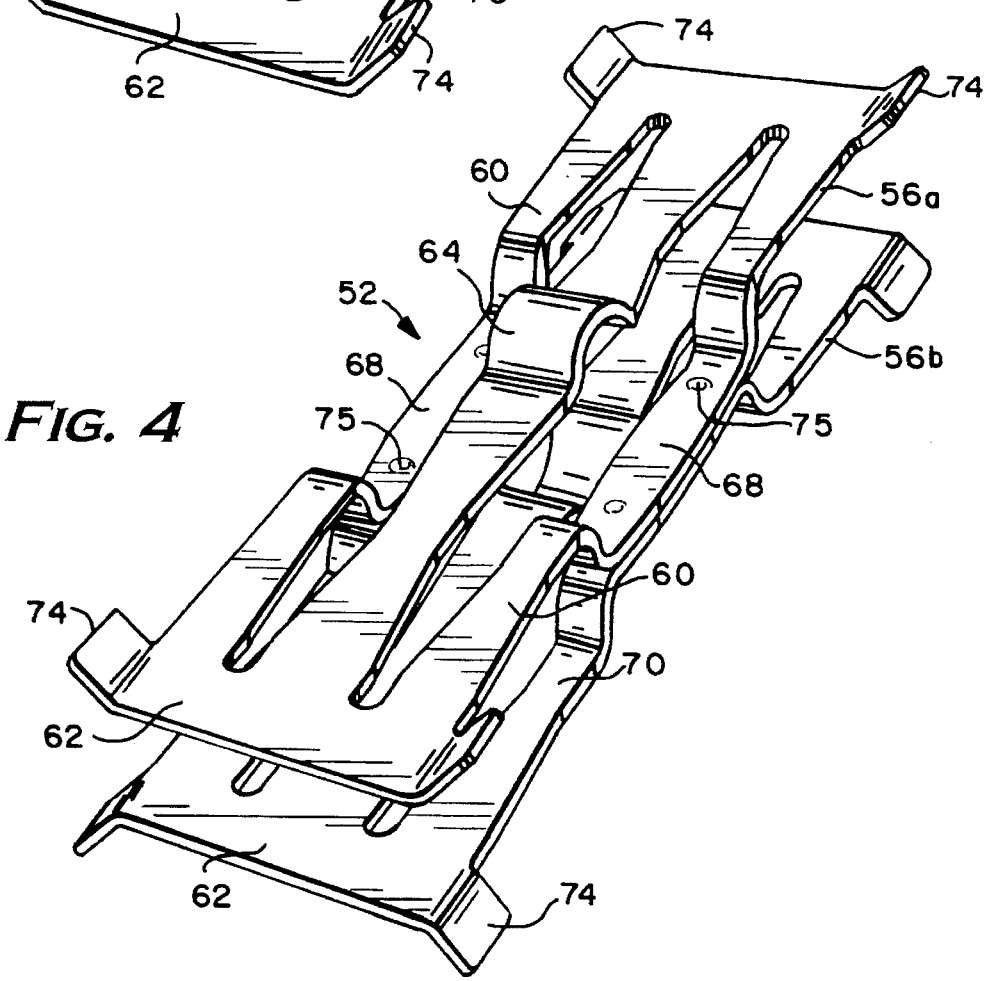

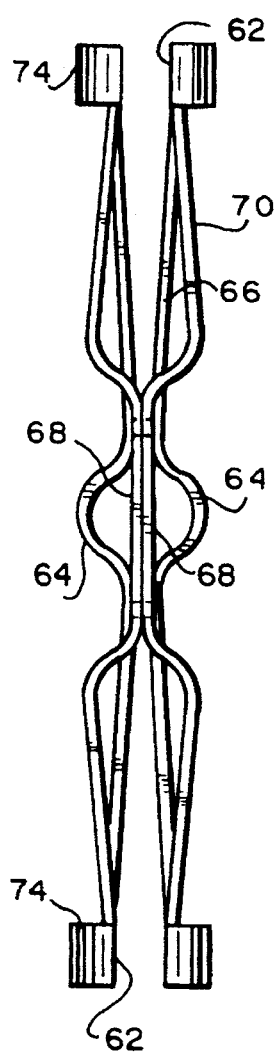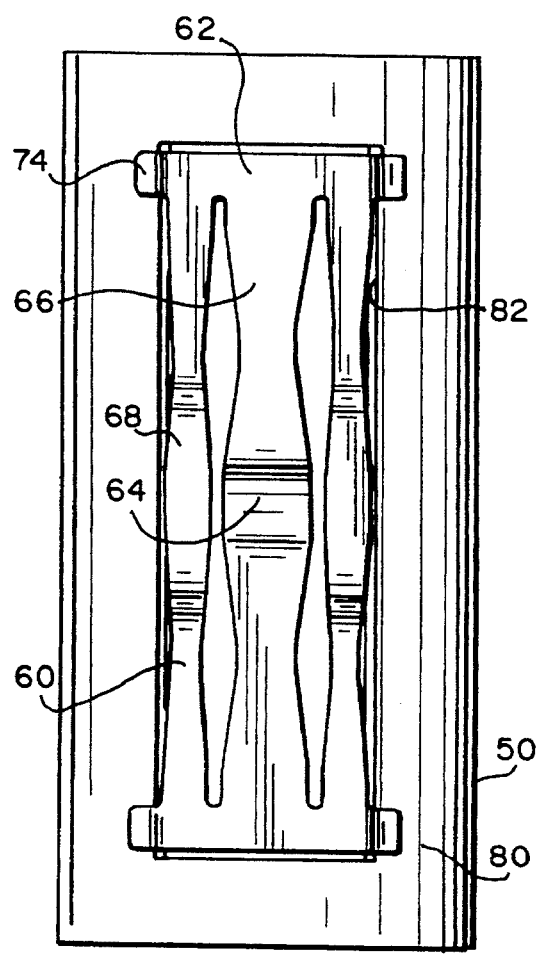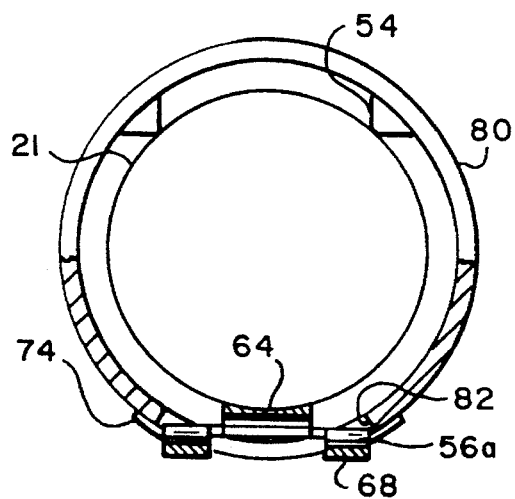

SPRING ASSEMBLIES FOR ADJOINING NUCLEAR FUEL ROD CONTAINING FERRULES AND A SPACER FORMED OF THE SPRING ASSEMBLIES AND FERRULES

TECHNICAL FIELD

The present invention relates to spring assemblies, a combination of spring assemblies and adjacent ferrules for locating nuclear fuel rods in the ferrules and spacers comprised of the spring assemblies and ferrules, all for use in a nuclear reactor.

BACKGROUND

In nuclear reactors, for example, a boiling water reactor, nuclear fuel rods are grouped together in an open-ended tubular flow channel, typically referred to as a fuel assembly or bundle. A plurality of fuel assemblies are positioned in the reactor core in a matrix and a coolant/moderator flows upwardly about the fuel rods for generating steam. The fuel rods are supported between upper and lower tie plates in side-by-side parallel arrays. Spacers are employed at predetermined elevations along the fuel bundle to restrain the fuel rods from bowing or vibrating during reactor operation.

A typical spacer for this purpose is disclosed in U.S. Pat. No. 5,002,726, of common assignee herewith. In that spacer, ferrules are arranged in a matrix, with each ferrule comprising a generally cylindrical element secured to an adjacent ferrule and having a generally C-shaped slot in the ferrule wall in registration with a corresponding slot in an adjoining ferrule. A closed-loop spring is disposed about the tabs of the C-shaped openings of adjoining ferrules and has medial portions projecting into the cylindrical spaces defined by the ferrules for engaging nuclear fuel rods within the adjacent ferrules and biasing the rods against stops adjacent opposite sides of the ferrules.

While this ferrule arrangement has proven satisfactory, there are problems associated with springs and ferrules of this and other types. For example, the coolant flow in a nuclear fuel rod bundle is upward and consists of a steam/water mixture. High-velocity water droplets impinge on the bottom of looped springs of this type and may cause erosion of the spring material. Further, looped springs of this type are comparatively expensive to manufacture. The ferrules similarly are expensive to manufacture because of the complex shape of the side cutout and tab necessary to mount the spring. Additionally, "soft assembly" is difficult with the spring ferrule arrangement. "Soft assembly" is a process in which fuel rods having a coating or protective surrounding sleeves are inserted into the spacers. The presence of a coating or sleeve requires clearance between the bulbous end portions of the looped springs and the fuel rod and this is difficult to obtain with these looped springs.

DISCLOSURE OF THE INVENTION

The present invention minimizes or eliminates the foregoing and other problems associated with spring assemblies and ferrule combinations in spacers for nuclear fuel bundles and provides a novel and improved spring assembly, a spring assembly and ferrule combination and nuclear fuel rod bundle spacer having various advantages in construction, mode of operation and use. Particularly, the spring assembly in one embodiment of the present invention comprises two identical spring bodies stamped from sheet metal and disposed in back-to-back relation between adjacent ferrules. Each spring body lies in a plane in an unstressed condition and has a central leaf, a pair of outer leaves spaced from the central leaf and an end portion joining ends of the central and outer leaves at each of the opposite ends of the spring body. The central leaf includes an intermediate portion projecting forwardly of the plane of the spring body to a fuel rod contacting front side of the plane. The pair of outer leaves of each spring body have intermediate portions projecting rearwardly of the plane of the spring body. Preferably, the end portions of the spring bodies have tabs projecting laterally beyond the outer leaves and in a forward direction. The spring bodies may be secured to one another in back-to-back relation to one another by spot welds along the rearwardly projecting intermediate portions of the outer leaves. The joining of the spring bodies prior to assembly is for convenience in handling and assembling the springs and ferrules to form the spacer. The welds Carry no loads.

The ferrules of the present invention are generally cylindrically shaped elements formed of sheet metal. Each ferrule has a generally rectilinear opening through a side wall of the ferrule. Pairs of stops are provided in the ferrule walls at locations generally opposite the rectilinear side wall opening. The ferrules are generally secured to one another by welding with the rectilinear openings in lateral registration with one another and spring assemblies therebetween.

When the spring assemblies are disposed between adjoining ferrules, the intermediate portion of the central leaf on one spring body projects forwardly into the interior of a ferrule for biasing the fuel rod in that ferrule against the stops in that ferrule. Similarly, the intermediate portion of the central leaf of the other spring body projects into the interior of the adjacent ferrule to bias the fuel rod in that ferrule against stops in that ferrule. With this arrangement, the load path on the spring assembly is through the central leaf to the end portions and through the outer leaves to their contact areas with one another. Thus, the inner and outer leaves act as springs in series, providing a low spring constant (soft spring). There is also flexing in the end portions. With a soft spring as here, variations in dimensions have a small effect on the spring force so that tight tolerances are not required.

It will be appreciated that with the foregoing design of the spring assembly and ferrule combination, the plane of the spring is parallel to the coolant flow so that water droplets impact essentially only on the end edges of the spring. Additionally, the spring may be stamped from sheet metal and formed, the stamping and forming operations being very simple processes. Further, the slot in the ferrule is a simple rectangle as compared with the complex shape of the slots of ferrules of prior designs. Additionally, the stiffness of the spring is low because each spring body consists of two springs in series. The deflection range is also quite large. As indicated previously, the prior art ends of looped springs are bulbous and therefore limit the space available for receiving coated or sleeved fuel rods. The present spring, however, does not have such space-limiting features.

In a further form of the present invention, there is provided a spring for location between a pair of adjacent ferrules wherein one of the ferrules has a generally rectilinear opening through a side wall thereof which lies in opposition to a side wall of an adjacent ferrule. The spring includes a spring body lying in a plane having a central leaf with an intermediate portion projecting to a forward side of the spring. A pair of outer leaves are spaced laterally from the central leaf and project to the opposite or rearward side of a plane passing through the spring body. The outer leaves have intermediate projections which project further beyond the plane of the spring body. In use, the spring body is disposed between the adjacent pair of ferrules, with the central leaf located within the rectilinear opening with its intermediate projection engaging the fuel rod for biasing the fuel rod against stops at the opposite side of the ferrule. The outer leaves lie between the adjacent ferrules and the intermediate portions of the outer leaves bear against the outer surface of the adjacent ferrule, providing a spring reaction force whereby the central leaf biases the fuel rod in the one ferrule.

To enable soft assembly of the fuel rods within a spacer comprising the springs of this latter form of the invention, the peripheral band about each spacer is provided with openings. Rods or pins are receivable within the openings for engaging the central leaf on its forward side and the edges of the rectilinear opening of the ferrule whereby the central projection can be displaced by compressing the central leaf in a direction away from the fuel rod. Consequently, the fuel rod may be inserted into the ferrule without interference from the projection of the central leaf of the spring.

In a preferred embodiment according to the present invention, there is provided a spring assembly for location between a pair of adjacent ferrules in a nuclear fuel bundle having a plurality of nuclear fuel rods passing through the ferrules and biasing the fuel rods of adjacent ferrules against stops in the ferrules, the spring assembly in an unstressed condition, comprising first and second spring bodies lying in respective planes, each spring body having a central leaf, a pair of outer leaves spaced from the central leaf, and an end portion at each of opposite ends of the spring body joining ends of the central and outer leaves, the central leaf of each spring body having an intermediate portion projecting forwardly of the plane of the spring body to a fuel rod contacting forward side of the plane, the pair of outer leaves of each spring body having intermediate portions projecting rearwardly of the plane of the spring body. The spring bodies are disposed in back-to-back relation to one another with the intermediate portions of the outer leaves engaging one another, the planes lying parallel to and spaced from one another and the end portions lying in registration with one another whereby the intermediate portions of the central leaves project to opposite sides of the assembly for engagement with fuel rods in next-adjacent ferrules.

In a further preferred embodiment according to the present invention, there is provided a spacer assembly for maintaining a matrix of nuclear fuel rods in spaced-apart relation between upper and lower tie plates, said spacer assembly comprising a matrix of ferrules for receiving the fuel rods in the spacer, each ferrule having a plurality of fuel rod contacting points for abutting the fuel rods, adjacent pairs of the ferrules in the matrix comprising cylindrical members each having an axis and open opposite ends, a generally rectilinear opening in a side wall thereof, the adjacent pairs of the ferrules being disposed in side-by-side relation to one another with the rectilinear openings in lateral registration with one another, with spring assemblies for location between the pairs of adjacent ferrules for biasing the fuel rods in the pair of ferrules into engagement with the contact points. Each spring assembly comprises first and second spring bodies lying in respective planes, each spring body having a central leaf, a pair of outer leaves spaced from the central leaf, and an end portion at each of opposite ends of the spring body joining the ends of the central and outer leaves, the central leaf of each spring body having an intermediate portion projecting forwardly of the plane of the spring body to a fuel rod contacting forward side of the plane, the pair of outer leaves of each spring body having intermediate portions projecting rearwardly of the plane of the spring body, the spring bodies being disposed in back-to-back relation to one another, with the intermediate portions of the outer leaves engaging one another, the planes lying parallel to and spaced from one another and the end portions lying in registration with one another. The spring assemblies are disposed between adjacent pairs of the ferrules with the intermediate portions of the central leaves lying in the rectilinear openings and the intermediate portions of the outer leaves lying between the adjacent pairs of ferrules.

In a still further preferred embodiment according to the present invention, there is provided a spring for location between a pair of adjacent ferrules in a nuclear fuel bundle having a plurality of nuclear fuel rods passing through the ferrules and biasing a fuel rod of one of the adjacent ferrules against stops in the one ferrule, the spring assembly in an unstressed condition, comprising a spring body lying in a plane and having a central leaf, a pair of outer leaves spaced laterally from the central leaf, and an end portion at each of opposite ends of the spring body joining ends of the central and outer leaves, the central leaf of the spring body having an intermediate portion projecting forwardly of the plane thereof to a fuel rod contacting forward side of the plane, the pair of outer leaves of the spring body lying rearwardly of the plane of the body and having intermediate portions projecting rearwardly of the outer leaves. The spring body is adapted for disposition between the adjacent ferrules with the intermediate portion of the central leaf projecting through an opening in the one ferrule for biasing the fuel rod therein against the stops and the intermediate portions of the outer leaves bearing against an outer surface of another ferrule of the adjacent ferrules.

In a still further preferred embodiment according to the present invention, there is provided a spacer assembly for maintaining a matrix of nuclear fuel rods in spaced-apart relation between upper and tie plates, said spacer assembly comprising a matrix of ferrules for receiving the fuel rods in the spacer, each ferrule having a plurality of fuel rod contacting points for abutting the fuel rods, adjacent pairs of the ferrules in the matrix comprising cylindrical members each having an axis, open opposite ends and a generally rectilinear opening in a side wall thereof, the adjacent pairs of the ferrules being disposed in side-by-side relation to one another with the rectilinear opening in the one ferrule lying in lateral registration with a side wall of another ferrule of the adjacent pairs thereof. A spring body is provided lying in a plane and having a central leaf, a pair of outer leaves spaced laterally from the central leaf, and an end portion at each of opposite ends of the spring body joining ends of the central and outer leaves, the central leaf of the spring body having an intermediate portion projecting forwardly of the plane thereof to a fuel rod contacting forward side of the plane, the pair of outer leaves of the spring body lying rearwardly of the plane of the body and having intermediate portions projecting rearwardly of the outer leaves. The spring body is disposed between the adjacent ferrules, with the intermediate portion of the central leaf disposed in the rectilinear opening for biasing the fuel rod in the one ferrule against the stops and the intermediate portions of the outer leaves disposed between the adjacent ferrules and engaged against an outer surface of another ferrule of the adjacent ferrules.

Accordingly, it is a primary object of the present invention to provide a novel and improved spring assembly, spring assembly and ferrule combination, and a spacer comprising the spring assembly and ferrule combination having the aforesaid and other various advantages in construction, operation and use as compared with prior art spring assemblies, spring and ferrule combinations and spacers containing such springs and ferrules.

BRIEF DESCRIPTION OF THE DRAWINGS

FIG. 3 is an enlarged perspective view of a spring body forming part of the spring assembly according to the present invention;

FIG. 4 is a perspective view of a pair of spring bodies forming the spring assembly hereof;

FIG. 8 is a view similar to FIG. 5 illustrating the spring assembly in a compressed condition;

FIG. 9 is a side elevational view of a spring body in the rectilinear opening of a ferrule;

FIG. 10 is a cross-sectional view thereof taken generally about on line 10—10 in FIG. 9;

BEST MODE FOR CARRYING OUT THE INVENTION

Figure 1:
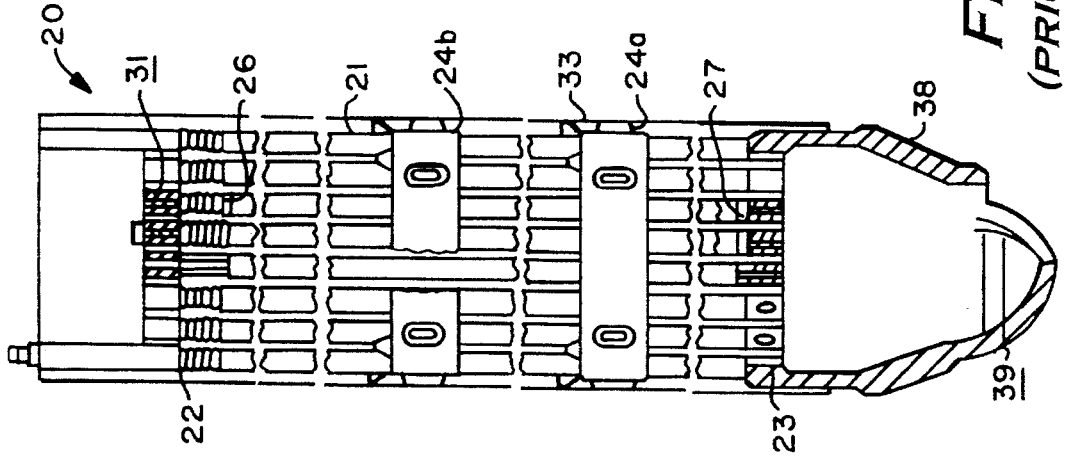
FIG. 1 is a side elevational view of a nuclear fuel bundle with portions broken out and in cross-section for ease of illustration.

Referring now to FIG. 1, there is illustrated a nuclear fuel assembly, generally designated 20, including a plurality of fuel elements or rods 21 supported between an upper tie plate 22 and a lower tie plate 23. Fuel rods 21 pass through a plurality of fuel rod spacers 24a and 24b which provide intermediate support to retain the elongated rods 21 in spaced relation and to restrain them from lateral vibration. In one embodiment, seven spacers are elevationally evenly spaced along the fuel assembly. While an 8×8 array of fuel rods is disclosed, it will be appreciated that the invention hereof is applicable to arrays of different numbers, for example, matrices of 10×10 arrays.

Each fuel rod 21 is formed of an elongated tubular cladding material with the nuclear fuel and other materials sealed in the tube by upper and lower end plugs 26 and 27, respectively. The lower end plugs 27 are registered and positioned in bores formed in the lower tie plate 23 for supporting the fuel bundle. The upper end plugs 26 are disposed in cavities 31 in the upper tie plate 22.

Typically, the fuel rod assembly includes a channel 33 of substantially square cross-section sized to form a sliding fit over the upper and lower tie plates 22 and 23 and the spacers 24 so that the channel 33 may readily be remounted and removed. The lower tie plate 23 includes a nose piece 38 adapted to support the fuel assembly 20 in a socket in a core support plate (not shown) in the reactor pressure vessel. The end of the nose piece is formed with openings 39 to receive coolant/moderator for flow upwardly along and among the fuel rods.

Figure 2:
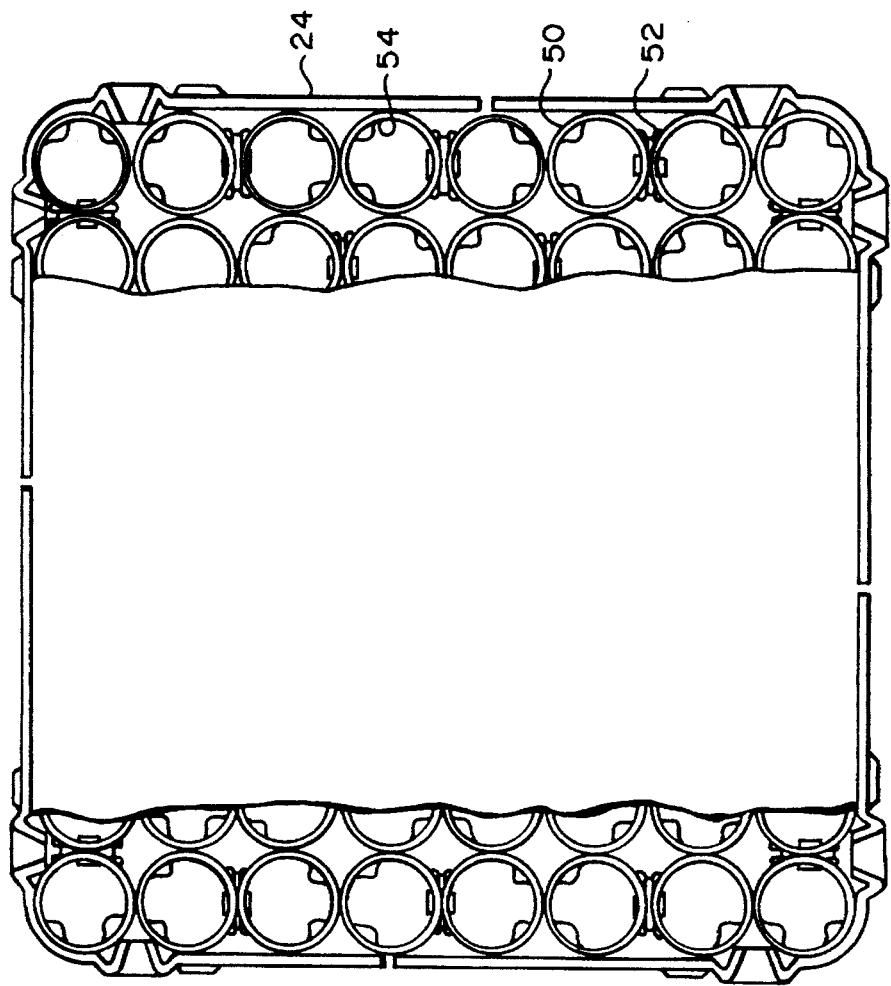
FIG. 2 is a plan view of a spacer showing spring assemblies and, with portions broken out, ferrules according to the present invention.

Turning now to FIG. 2, there is illustrated a spacer constructed in accordance with the present invention having the spring assemblies and ferrule combinations hereof. The spacer is comprised of a plurality of cylindrical ferrules 50 and spring assemblies 52, both of which are described in detail hereinafter. Each spacer 24 thus comprises a plurality of ferrules 50 arranged in a square matrix in which each ferrule receives a fuel rod and maintains the fuel rods spaced and restrained relative to one another. The spring assemblies 52 bias the fuel rods in a lateral direction against stops 54 whereby the fuel rods are maintained in a predetermined position relative to one another and in the spacer 24.

Referring now to FIGS. 3–7, the spring assembly 52 will be described. Referring to FIG. 3, each spring assembly 52 includes two identical spring bodies, one of which is illustrated in FIG. 3. Thus, in FIG. 3, spring body 56a includes, in an unstressed condition, a central elongated leaf 58, a pair of outer leaves 60 straddling central leaf 58 and spaced laterally therefrom, and end portions 62 joining the ends of the central and outer leaves 58 and 60, respectively, at opposite ends of the spring body 56a. Central leaf 58 includes an arcuate projection 64 intermediate its ends and preferably medially thereof. Central leaf 58 also includes leg portions 66 which join the intermediate projection 64 and the end portions 62. Outer leaves 60 include intermediate, preferably medial, portions 68 which project in a direction opposite from the central portion 64 of the central leaf 58. Outer leaves 60 also include leg portions 70 joining the central portions 68 and the end portions 62 to one another.

Figure 5:
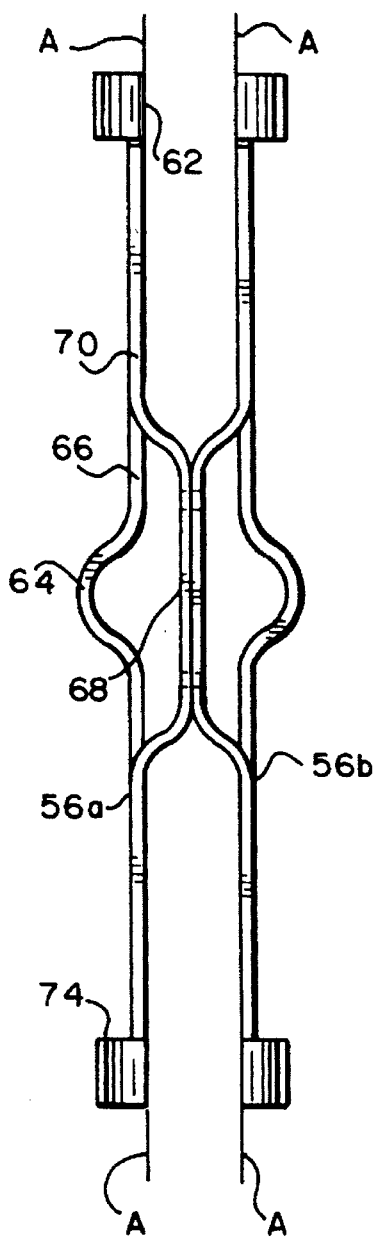
FIG. 5 is a side elevational view of a spring assembly according to the present invention.
Figure 6:
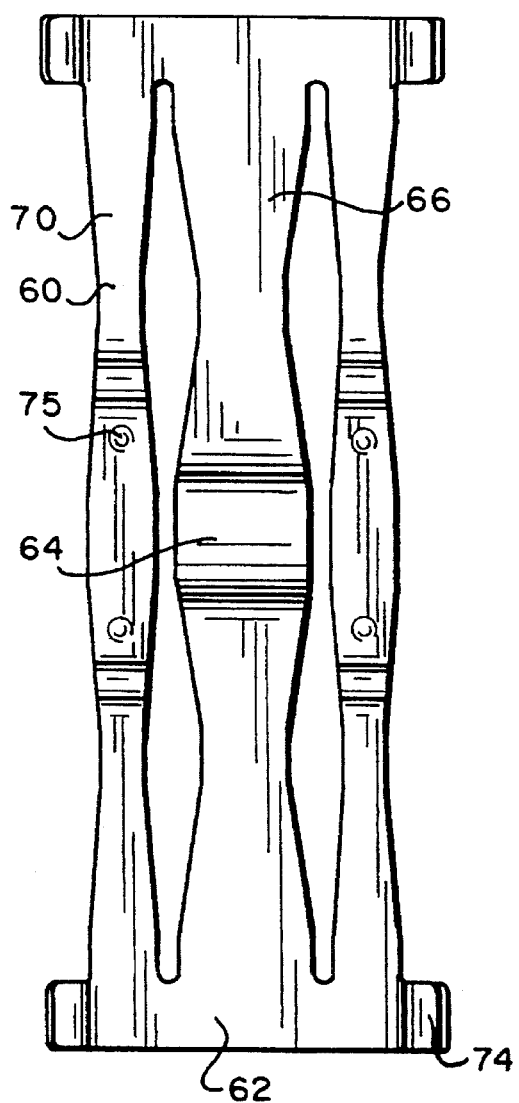
FIGS. 6 and 7 are elevational and end views, respectively, of the spring assembly of FIG. 5.
Figure 7:
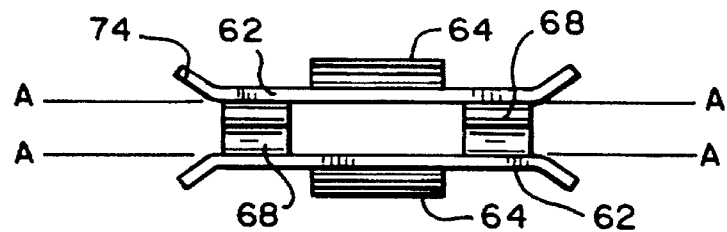

As best seen in FIG. 5, the leg portions 66 of central leaf 58 and leg portions 70 of outer leaves 60, as well as the end portions 62 of the spring body 56a lie in a common plane, designated A—A in FIG. 5 fin an unstressed condition of the spring assembly. Thus, the arcuate projection 64 of the central leaf 58 projects to a forward side of the plane A—A. More particularly, central portion 68 projects outwardly of the plane A—A of the spring body to a fuel rod contacting front side of the plane as described hereinafter. Conversely, the projecting intermediate portions 68 of the outer leaves 70 project rearwardly to the opposite side of the plane A—A, as best illustrated in FIG. 5. Also as indicated upon comparison of FIGS. 3 and 5, end portions 62 have end tabs 74 which project to the forward or fuel rod contacting front side of the plane A—A for overlying the outer surface of a ferrule, as described below.

As best illustrated in FIGS. 4 and 5, it will be appreciated that the spring bodies 56a and 56b are disposed in back-to-back relation one to the other. For convenience in handling the spring assembly and assembling the spring bodies and ferrules to form a spacer, the spring bodies 56a and 56b are secured in back-to-back relation, preferably by spot welds 75 along the intermediate portions 68 of outer leaves 70 which abut one another in assembly. In such assembly, the arcuate projections 64 of the central leaves project to opposite sides of the spring assemblies, i.e., toward adjacent fuel rods in adjacent ferrules, as described below. The intermediate portions 68 of the outer leaves 60 lie in back-to-back relation one to the other. With this configuration, the load applied to the springs through the arcuate projections 64 follows a load path through the end portions 62 and through the outer leaves 60 to the back-to-back contact area of projections 68. The central and outer leaves thus act as springs in series, providing a low spring constant, i.e., a soft spring, while affording some flexing in the end portions 62. Particularly note that in the assembly, the plane of each spring body lies essentially parallel to the direction of coolant flow, thus presenting only edges of the spring assembly to the flow. Also, there is only one projection, i.e., the central projection 64 of central leaf 58 which lies in the path of fuel rod insertion into the ferrule. FIG. 8 represents the configuration of the spring assembly when in a stressed condition in use.

Referring now to FIGS. 9 and 10, there is illustrated a ferrule 50 according to the present invention. Particularly, ferrule 50 includes a generally cylindrical or tubular element 80 open at its opposite ends and having a rectangular or rectilinear opening or aperture 82 formed through a side wall thereof. As will be appreciated from a review of FIG. 2, the ferrules are secured to one another in a rectilinear array of ferrules, generally a square matrix thereof, and may be coupled one to the other, for example, by welding. In FIG. 10, the spring body 56a is illustrated in position within the opening 82 in bearing engagement against the fuel rod, it being appreciated that, in this form of the invention, only one-half of the spring assembly is illustrated. It will be seen with respect to FIG. 10 that the arcuate projection 64 extends into the ferrule 80 through the rectilinear slot 82 for engagement with the fuel rod 21, biasing it against the stops 54 at the opposite side of the ferrule. The projections 68 lie generally outside the cylindrical confines of the ferrule 80 and the tabs 74 overlie the outer surface of ferrule 80.

Figure 11:
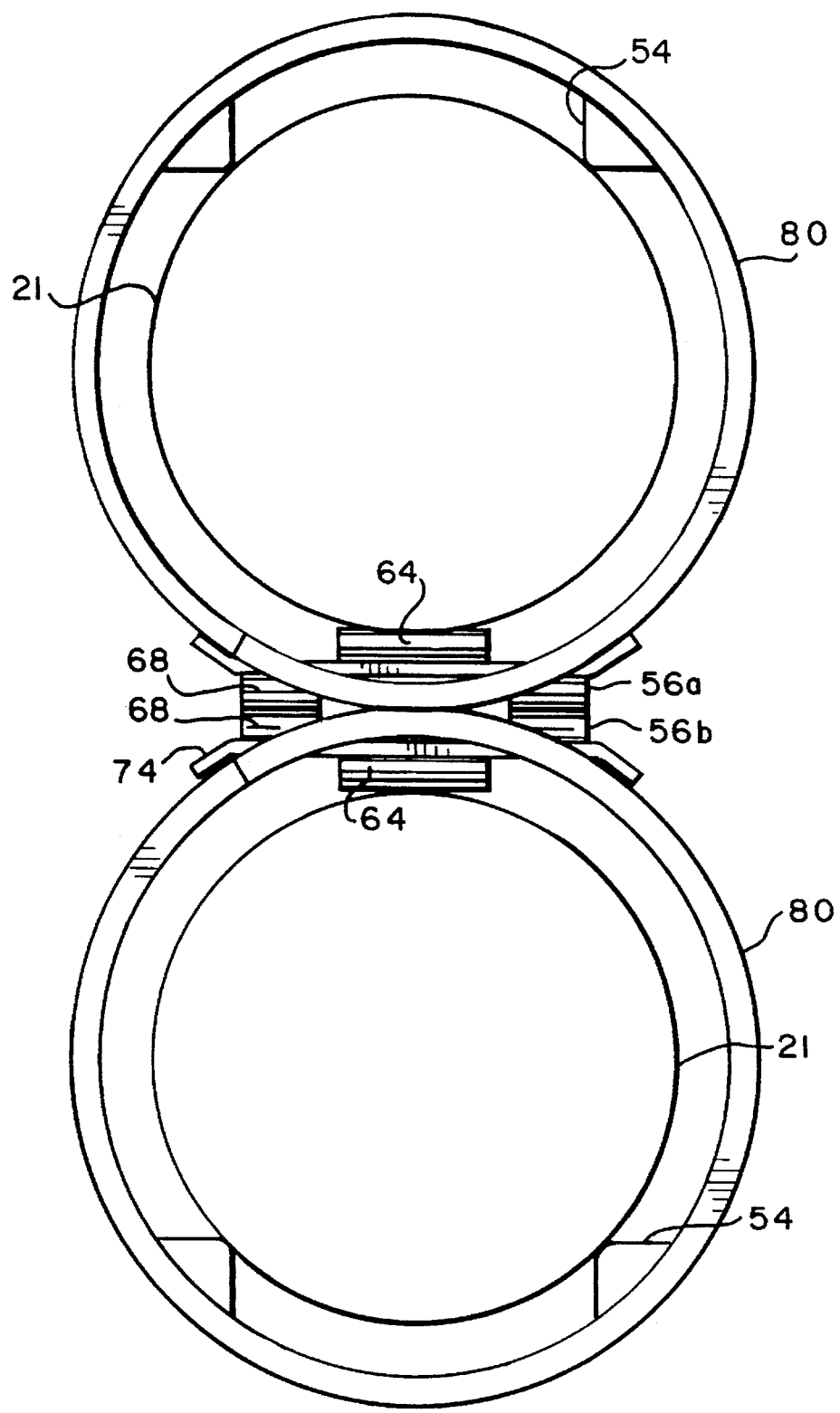
FIG. 11 is an end view of a pair of adjacent ferrules with the spring assembly hereof disposed therebetween.

Referring to FIG. 11, the spring assembly of FIG. 4 is illustrated between adjoining ferrules 80. Thus, as illustrated, the intermediate portions 68 of the outer leaves 60 of the back-to-back disposed spring bodies 56a and 56b are welded one to the other and lie outside of the confines of both ferrules. The spring projections 64, of course, lie within the confines of the ferrules and engage fuel rods 21 within the ferrules 80. The tabs 74 overlie the outer surfaces of the ferrules and locate the spring assembly laterally. The ferrules 80 are secured to one another, preferably by welding.

With this spring assembly and ferrule combination disposed in the spacer, for example, as illustrated in FIG. 2, it will be appreciated that the planes A—A of the spring assembly bodies lie generally parallel to the coolant flow so that water droplets impinge on the edges of the spring. The spring bodies are advantageously stamped from sheet metal, while a rectilinear or rectangular slot 82 is formed in the ferrule 80, thus reducing manufacturing costs. Note also that the stiffness of the spring assembly is low because each half of the spring assembly consists of two springs in series. The deflection range is large and, with the exception of the projections 64, the spring assemblies do not have space limiting features.

Figure 12:
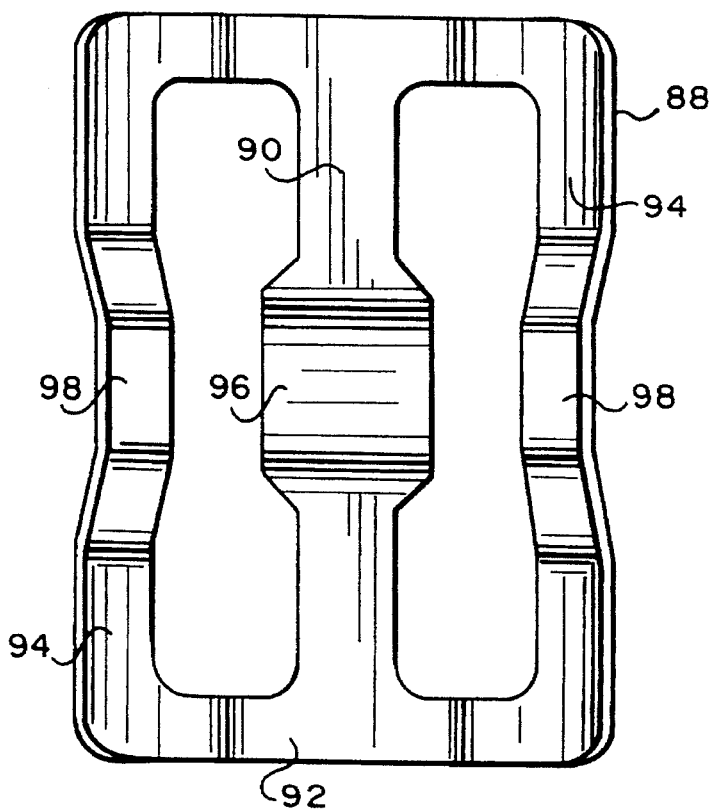
FIG. 12 is an elevational view of a sheet metal spring for acting on a single fuel rod in accordance with a further embodiment of the present invention.
Figure 14:
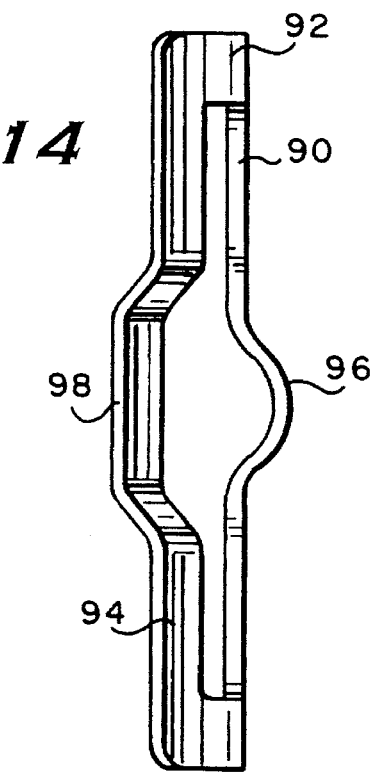
FIG. 14 is a side elevational view of the spring illustrated in FIG. 12.
Figure 13:
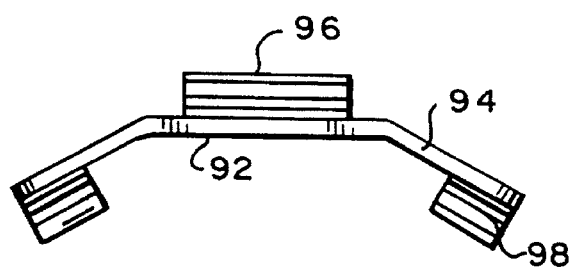
FIG. 13 is an end elevational view of the spring.

Referring now to the embodiment hereof illustrated in FIGS. 12–18, there is provided a spring formed of sheet metal which acts on a single fuel rod. As illustrated in FIGS. 12–14, the spring includes a spring body 88 having a central leaf 90 joined at opposite ends to end portions 92. A pair of outer leaves 94 are laterally spaced from and straddle the central leaf 90, the outer leaves likewise being connected at their opposite ends to the end portions 92. The central leaf 90 has an arcuate projection 96, preferably medially of the spring, and which projects to a forward side of the spring for engagement against a fuel rod. The spring also includes outer leaves 94 which are projected out of the plane of the spring to a rearward side of the spring as illustrated in FIG. 13. The outer leaves 94 also have a rearwardly extending intermediate, preferably medial projections 98 for bearing against the outer surface of the adjoining ferrule in the spacer.

Figure 16:
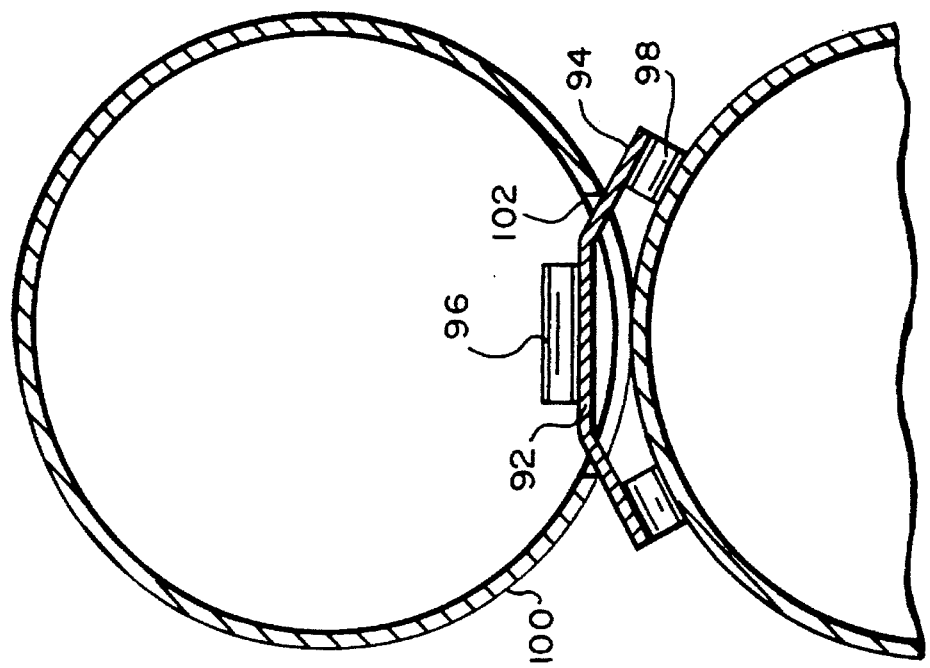
FIG. 16 is a cross-sectional view of the spring of FIG. 12 in use between adjacent ferrules.
Figure 15:
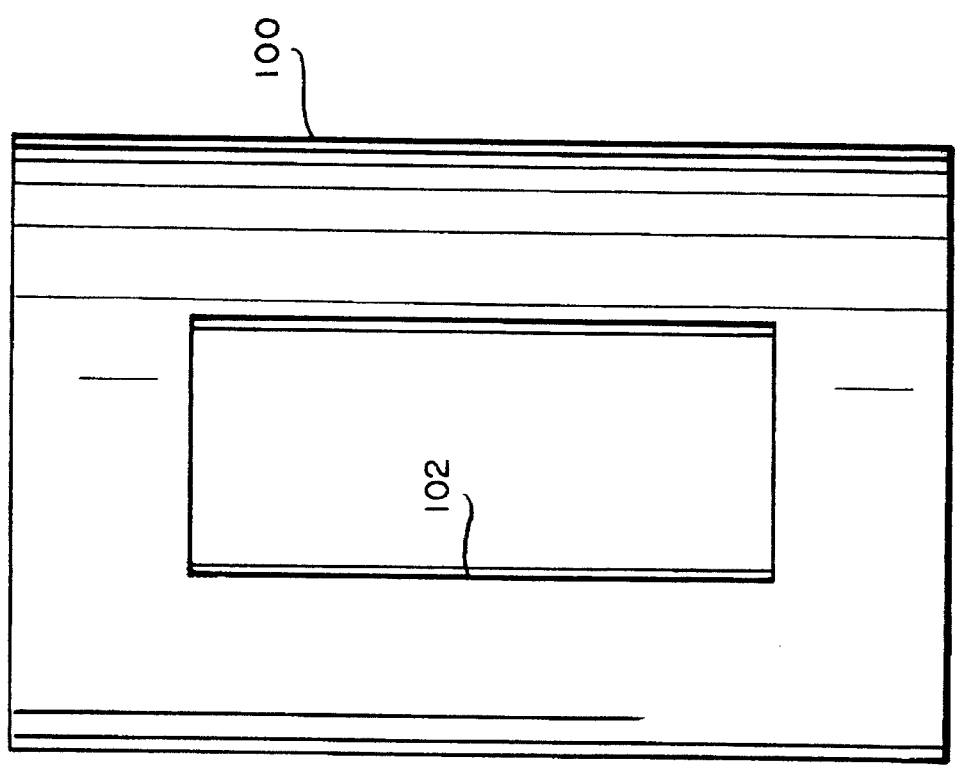
FIG. 15 is a side elevational view of a ferrule with a rectangular slot through the side wall thereof.
Figure 18:
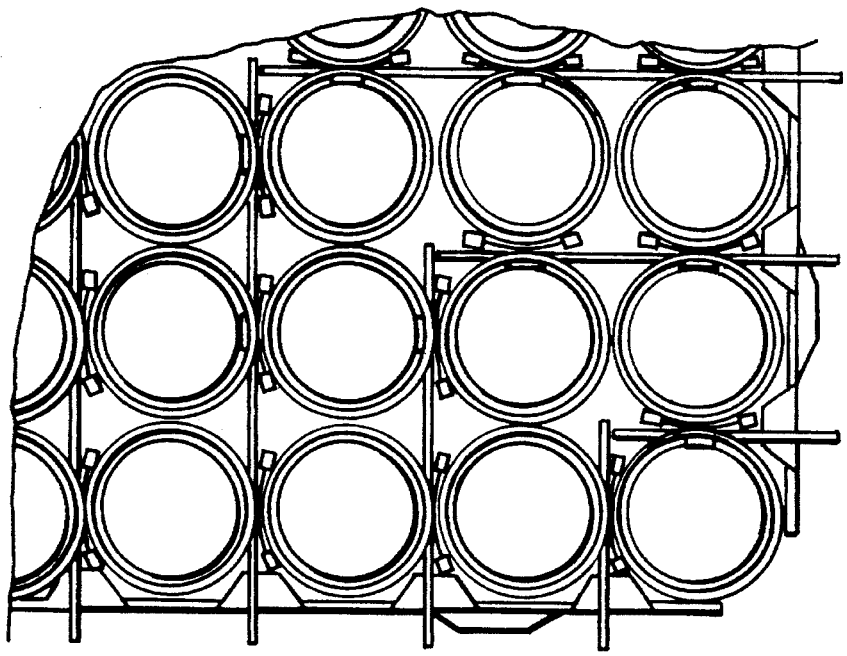
FIG. 18 is a view of a spacer with a plurality of bars inserted through side openings in the spacer wall for compressing the springs facilitating insertion of the fuel rods.

Referring now to FIG. 15, there is illustrated a ferrule 100 comprised of a generally cylindrical element open at its opposite ends and having a generally rectangular or rectilinear opening or aperture 102 through a side wall thereof. Ferrules of this type are arranged in the spacer as illustrated in FIGS. 16 and 18, with the rectangular slot in opposition to a solid wall portion of the adjoining ferrule. As illustrated in FIG. 16, the central portion of the spring 88 lies inwardly of the rectangular slot 102 of ferrule 100, with the medial projection 96 projecting inwardly to engage the fuel rod within the spacer. The end portions 92 bear against the side margins of the rectilinear opening 102. The rearwardly projecting portions 98 of the outer leaves 94 bear against the outer surface of the adjoining ferrule 100. With the ferrules 100 secured to one another, for example, by welding, it will be appreciated that the spring 88, similarly as in the first embodiment, provides a load path through the central leaf 90 to the end portions 92 and through the outer leaves 94 to the contact area between the projections 98 and the outer surface of the adjoining ferrule. Thus, the central and outer leaves act as springs in series, providing a low spring constant.

Figure 17:
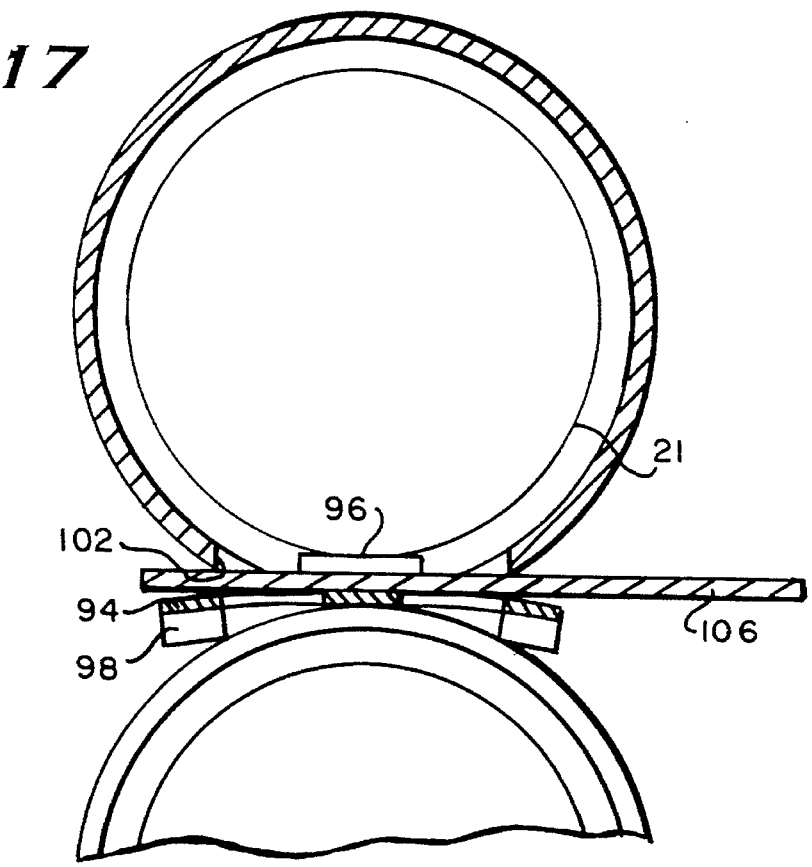
FIG. 17 is a view similar to FIG. 16 illustrating the insertion of a bar to compress the spring to facilitate insertion of the fuel rod into the ferrule.

To facilitate insertion of the fuel rods into the ferrules of the spacer, a bar or pin 106 can be inserted between the spring 88 and the ferrule 100, as illustrated in FIG. 17. Thus, the pin 106 may be employed to compress the spring and hence deflect the projections 96 and 98 more towards the central plane of the spring whereby the central portion 96 of the center leaf is spaced back from the position of the fuel rod within the ferrule. By spacing the central spring projection from the fuel rod, the fuel rod may be readily inserted into the spacer, without any force being applied thereto by the spring.

A complete fuel rod insertion operation is illustrated in FIG. 18, wherein it will be seen that the pins 106 can be inserted through suitable openings in the peripheral bands surrounding the spacer. Also, it will be noted that the pins 106 compress more than one spring and typically several springs. The pins 106, of course, are withdrawn from the assembly once the fuel rods are inserted into the spacers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spring assembly for location between a pair of adjacent ferrules in a nuclear fuel bundle having a plurality of nuclear fuel rods passing through the ferrules and biasing the fuel rods of adjacent ferrules against stops in the ferrules, the spring assembly in an unstressed condition, comprising:

first and second spring bodies lying in respective planes, each spring body having a central leaf, a pair of outer leaves spaced from said central leaf, and an end portion at each of opposite ends of said spring body joining ends of said central and outer leaves, said central leaf of each spring body having an intermediate portion projecting forwardly of the plane of said spring body to a fuel rod contacting forward side of said plane, said pair of outer leaves of each spring body having intermediate portions projecting rearwardly of the plane of said spring body, said spring bodies being disposed in back-to-back relation to one another with said intermediate portions of said outer leaves engaging one another, said planes lying parallel to and spaced from one another and said end portions lying in registration with one another whereby said intermediate portions of said central leaves project to opposite sides of said assembly for engagement with fuel rods in next-adjacent ferrules.

2. A spring assembly according to claim 1 wherein said end portions extend laterally beyond the outer leaves, terminating in end tabs.

3. A spring assembly according to claim 2 wherein said end tabs on each spring body project out of the plane of said body and to said forward side of said plane.

4. A spring assembly according to claim 1 wherein said intermediate portions of said outer leaves are welded in back-to-back relation to one another.

5. A spring assembly according to claim 1 wherein each said central leaf is resiliently flexible for bending movement in a rearward direction.

6. A spring assembly according to claim 1 wherein said spring bodies are formed of sheet metal.

7. A spring assembly according to claim 1 in combination with a pair of ferrules, each ferrule comprised of a cylindrical member having an axis, open opposite ends and a generally rectilinear opening in a side wall thereof, said ferrules being disposed in side-by-side relation to one another with said rectilinear openings in lateral registration with one another, said spring assembly being disposed between said ferrules with the intermediate portions of said central leaves disposed in said rectilinear openings and said intermediate portions of said outer leaves disposed between said ferrules.

8. The combination of claim 7 wherein said end portions extend laterally beyond the outer leaves and terminate in end tabs, said end tabs on each spring body projecting forwardly out of the plane of said body to overlie outer surfaces of said ferrules for laterally locating the spring assembly.

9. A spacer assembly for maintaining a matrix of nuclear fuel rods in spaced-apart relation between upper and lower tie plates, said spacer assembly comprising:

a matrix of ferrules for receiving the fuel rods in said spacer, each ferrule having a plurality of fuel rod contacting points for abutting the fuel rods, adjacent pairs of said ferrules in said matrix comprising cylindrical members each having an axis, open opposite ends and a generally rectilinear opening in a side wall thereof, said adjacent pairs of said ferrules being disposed in side-by-side relation to one another with said rectilinear openings in lateral registration with one another;

spring assemblies for location between said pairs of adjacent ferrules for biasing the fuel rods in said pair of ferrules into engagement with said contact points;

each said spring assembly comprising first and second spring bodies lying in respective planes, each said spring body having a central leaf, a pair of outer leaves spaced from said central leaf, and an end portion at each of opposite ends of said spring body joining the ends of said central and outer leaves, said central leaf of each spring body having an intermediate portion projecting forwardly of the plane of said spring body to a fuel rod contacting forward side of said plane, said pair of outer leaves of each spring body having intermediate portions projecting rearwardly of the plane of said spring body, said spring bodies being disposed in back-to-back relation to one another, with said intermediate portions of said outer leaves engaging one another, said planes lying parallel to and spaced from one another, said end portions lying in registration with one another;

said spring assemblies being disposed between said adjacent pairs of said ferrules with the intermediate portions of said central leaves lying in said rectilinear openings and said intermediate portions of said outer leaves lying between said adjacent pairs of said ferrules.

10. A spacer assembly according to claim 9 wherein said end portions of each said spring assembly extend laterally beyond the outer leaves terminating in end tabs, said end tabs on each said spring body projecting forwardly out of the plane of said body to overlie the outer surface of a ferrule of said adjacent pairs of ferrules.

11. A spring for location between a pair of adjacent ferrules in a nuclear fuel bundle having a plurality of nuclear fuel rods passing through the ferrules and biasing a fuel rod of one of the adjacent ferrules against stops in the one ferrule, the spring assembly in an unstressed condition, comprising:

a spring body having a central leaf lying in a plane, a pair of outer leaves spaced laterally from said central leaf, and an end portion at each of opposite ends of said spring body joining ends of said central and outer leaves, said central leaf of said spring body having an intermediate portion projecting forwardly of said plane to a fuel rod contacting forward side of said plane, said pair of outer leaves of said spring body lying rearwardly of the plane of said body and having intermediate portions projecting rearwardly of said outer leaves, said spring body being adapted for disposition between the adjacent ferrules with the intermediate portion of said central leaf projecting through an opening in the one ferrule for biasing the fuel rod therein against the stops and the intermediate portions of said outer leaves bearing against an outer surface of another ferrule of the adjacent ferrules.

12. A spring according to claim 11 in combination with the pair of adjacent ferrules, each ferrule comprised of a cylindrical member having an axis, open opposite ends and a generally rectilinear opening in a side wall thereof, said ferrules being disposed in side-by-side relation to one another with said rectilinear opening in said one ferrule in lateral registration with a side wall of another ferrule of said adjacent ferrules, said spring assembly being disposed between said adjacent ferrules with the intermediate portion of said central leaf disposed in said rectilinear opening for biasing the fuel rod in the one ferrule against the stops and said intermediate portions of said outer leaves disposed between said adjacent ferrules and engaged against an outer surface of said another ferrule of said adjacent ferrules.

13. A spacer assembly for maintaining a matrix of nuclear fuel rods in spaced-apart relation between upper and lower tie plates, said spacer assembly comprising:

a matrix of ferrules for receiving the fuel rods in said spacer, each ferrule having a plurality of fuel rod contacting points for abutting the fuel rods, adjacent pairs of said ferrules in said matrix comprising cylindrical members each having an axis, open opposite ends and a generally rectilinear opening in a side wall thereof, said adjacent pairs of said ferrules being disposed in side-by-side relation to one another with said rectilinear opening in said one ferrule lying in lateral registration with a side wall of another ferrule of said adjacent pairs thereof;

a spring body having a central leaf lying in a plane, a pair of outer leaves spaced laterally from said central leaf, and an end portion at each of opposite ends of said spring body joining ends of said central and outer leaves, said central leaf of said spring body having an intermediate portion projecting forwardly of the plane thereof to a fuel rod contacting forward side of said plane, said pair of outer leaves of said spring body lying rearwardly of the plane of said body and having intermediate portions projecting rearwardly of said outer leaves;

said spring body being disposed between said adjacent ferrules, with the intermediate portion of said central leaf disposed in said rectilinear opening for biasing the fuel rod in the one ferrule against the stops and said intermediate portions of said outer leaves disposed between said adjacent ferrules and engaged against an outer surface of said another ferrule of said adjacent ferrules.

14. A spacer according to claim 13 having a peripheral band about said ferrules within said spacer and openings in said band, pins received through said openings in said band and engageable with the central leaf and margins of the rectilinear opening in said one ferrule for compressing the spring and displacing the projection on said central leaf in a direction toward said plane of the spring body.

15. A spring according to claim 11 wherein said outer leaves lie in discrete planes angled relative to one another and intersecting at a location forwardly of the plane through said central leaf.

* * * * *